UNITED STATES PATENT OFFICE.

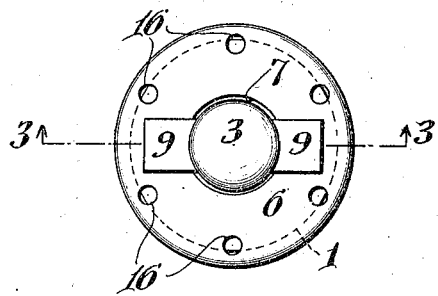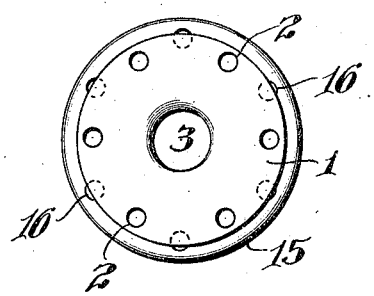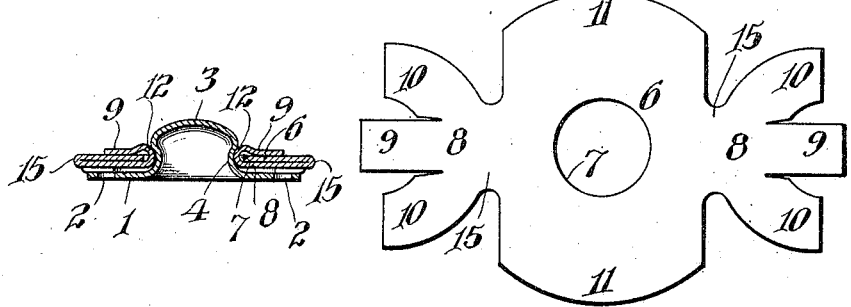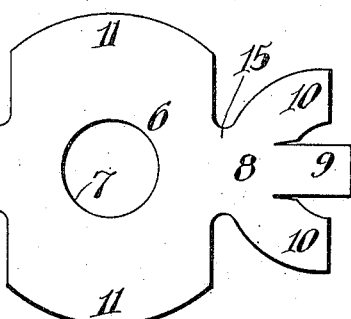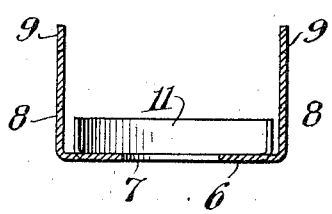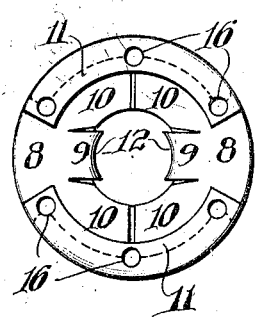

JAMES P. WILLIAMS, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SNAP-FASTENER.

1,044,110.          Specification of Letters Patent.     Patented Nov. 12, 1912.

Application filed August 16, 1911. Serial No. 644,266.

*To all whom it may concern:*

Be it known that I, JAMES P. WILLIAMS, a citizen of the United States, residing in the city and county of Philadelphia, State of Pennsylvania, have invented certain new and useful Improvements in Snap-Fasteners, of which the following is a specification.

My invention relates to improvements in snap fasteners and more particularly to the socket member thereof.

One of the objects of my invention is to provide the socket member of a snap fastener so constructed and arranged of a single plate of metal that it shall possess the qualities of strength and rigidity, combined with the resiliency necessary to render it practicable and satisfactory in use.

Other objects and advantages of my invention will be referred to and set forth in the detailed description thereof which follows or will be apparent from such description.

One convenient form of embodiment of my invention is illustrated in the accompanying drawing forming a part of this specification, but it will be understood that changes in the details of construction may be made within the scope of the claims without departing from my said invention.

For the purpose of more readily understanding and comprehending my invention reference should be had to the drawings, in which,—

Figure 1 is a plan view of one side of the socket member of a snap fastener with the ball of the ball member projecting through its socket; Fig. 2 is a bottom plan view of the ball member of a snap fastener in engagement with the socket member thereof with the edges of the latter projecting beyond the edges of the said ball member; Fig. 3 is a transverse section on the line 3—3 of Fig. 1; Fig. 4 is a plan view of one side of the blank of which the socket member of the fastener is constructed; Fig. 5 is a transverse section of the plate of which the socket member is constructed showing the outer edges of the plate turned up substantially at right angles to the plane of the said plate and illustrating a step in the method of making the said socket member; and Fig. 6 is a plan view of the side of the socket member of the fastener opposite that which is shown in Fig. 1 of the drawing, the ball member of the fastener being omitted.

Referring to the drawings, 1 designates what may be termed the flange portion of the ball member of the fastener which is provided with thread holes 2 by means of which the said member is secured to a garment or other article by means of threads or similar means which pass through the said holes and are connected to the said garment or other article.

3 designates the ball or stud of the ball member of the fastener which is connected to the flange portion thereof by means of a neck portion 4.

As illustrated in the drawings, the socket member of the fastener engages the neck portion 4 of the ball member and also the underside of the ball or stud of such member whereby the two members of the fastener are separably interlocked or secured together. The socket member of the fastener is constructed of a single integral plate. One side of the said member consists of the solid central portion 6 of said plate and is provided with a socket opening 7. The opposite side of said member consists of portions of said plate which are bent from the outer edge of the portion 6 inwardly and into close and operative relation with the said portion 6. The said opposite side consists of the diametrically disposed parts 8, the inner ends of which are divided into three parts 9 and 10, and the oppositely disposed parts 11 which lap over or overlie the parts 10.

The inner ends of the intermediate or central parts 9 are bent and extended through the socket hole or opening 7 and around the edges thereof as shown at 12. The inside of the bends are spaced from the edges of the socket hole or opening 7 in order to permit the parts 9 to yield outwardly and thus allow the insertion and withdrawal of the head of the ball member through the socket between the bends 12 of the spring holding parts 9. Also the part 9, at points upon opposite sides of the inner edge portion 6 surrounding the socket hole or opening 7 are bent and bellied out slightly for the purpose of spacing the opposite sides of the said bends from the opposite side of said portion 6 adjacent to the edge of the said socket hole or opening 7 so that the spring holding parts 9 may move laterally; that is, transversely of the plane of the portion 6 when the ball or stud 3 of the ball member is inserted or withdrawn. The ball or stud 3 may be inserted from either side of the socket member, the spring holding parts 9 acting with equal efficiency from whatever side of the said member the ball is inserted.

The portions 10 upon opposite sides of the central portions 9 extend toward each other in contact with or in close proximity to the plate 6. Their outer edges are of circular shape or outline and are located inside of the outer edge of the plate 6 and inside of the circular line along which the parts 11 are bent. The inner edges of the parts 10 are cut or otherwise formed upon a radius of substantially the same length as the radius of the hole 7 through the plate 6 so that when the parts 10 are turned down into positions in contact with or substantially in contact with plate 6 the said inner edges are substantially coincident with the circular edge of the said opening 7. The ends of the parts 10 may abut or not as may be most convenient to or desired by the manufacturer. As illustrated in the drawings the said ends are not in direct contact with each other but are in close proximity to each other.

The portions 11, which are diametrically opposed to each other, as is illustrated in the drawings, and which extend around the greater portion of the edge of the socket member of the fastener, are formed by turning or bending over segmental parts of the plate from which the fastener is formed or constructed. As already stated the said over turned portions 11 overlap the outer edges of the parts 10 as is clearly shown in Fig. 6 of the drawings.

When the socket member of the fastener is constructed in the manner indicated the ball member is held in engagement therewith by the spring action of the oppositely disposed holding parts 9.

The portions 8 are connected to opposite points of the edges of the portion 6 of the socket member by means of relatively narrow portions of plate 15 and in order that the parts 8, comprising the spring holding parts 9 and the parts 10, may possess the necessary rigidity and be held securely against accidental displacement, the parts 11 are provided which not only serve the purpose of holding the said part securely in the proper and desired relation with respect to the side 6 of the socket member but also add to the neatness of the said member by reason of the fact that by bending or turning the said parts 11 as well as the parts 8 inwardly and into close relation with the central part 6 of the plate the outer edge of the said member of the fastener is made to consist of a convex surface.

By constructing the socket member of the fastener in the manner shown I am enabled to provide a structure consisting of a single integral plate in which the spring holding action is involved in the integrality of the said structure.

For the purpose of securing the socket member of the fastener to a garment or other article I have provided thread holes 16 therethrough near the peripheral edge thereof through which sewing threads are passed which threads engage such garment or article and thereby connect or secure the said member thereto. However, any other suitable means may be employed for securing the said socket member to a garment or other article.

Although I have illustrated the socket hole or opening in the socket member and the ball of the ball member (which is adapted to coöperate with said socket member) as being substantially circular in outline, it should be understood that the shape of the said hole or opening and the said ball may be varied as is desired. In other words my invention is not limited to the shape or contour of the socket hole or opening or the ball of the ball member which is to coöperate therewith.

Having thus described my invention, I claim:—

1. The socket member of a snap fastener consisting of an integral plate having a central socket opening and also having oppositely disposed portions which are bent inwardly and into close relationship with said plate, and the said portions respectively comprising a spring holding member and parts upon opposite sides of the said member which parts occupy positions concentric with the socket opening of the socket member, and oppositely disposed parts which over-lap the edges of the said concentrically arranged parts.

2. The socket member of a snap fastener consisting of an integral plate having a body portion provided with a central socket opening, oppositely disposed portions which are bent over and inwardly toward the said central opening, which portions respectively include a spring holding member which extends through the said socket opening and is bent over and around portions of the edge thereof and parts situated on opposite sides of the said spring holding member which parts are concentric with the said socket opening and with the peripheral edge of the said body portion, and means for engaging the said last mentioned parts and holding the same securely in position in close relation with the said body portion.

3. The socket member of a snap fastener consisting of an integral plate of suitable material having a central socket opening and having oppositely disposed parts which are bent down into close relationship with the said plate and the said parts including spring holding members which extend through the socket opening and are bent around and over portions of the edge of said plate surrounding the said socket opening and the said plate also having oppositely disposed segmental parts which overlap the outer edges of the said parts.

4. The socket member of a snap fastener constructed of a single integral plate in which one side of the fastener consists of the solid central portion of the said plate and is provided with a central socket hole or opening and in which the opposite side consists of a plurality of oppositely disposed portions including spring holding parts which extend through the said socket hole or opening and are bent over the edges thereof and a plurality of additional oppositely disposed parts which overlie the opposite outer edges of the said first named portions.

5. The socket member of a snap fastener constructed of a single integral plate and in which one side consists of a solid portion of the plate having a socket hole or opening therein and in which the opposite side thereof consists of a plurality of oppositely disposed portions which include spring acting parts for engaging and holding the ball of the ball member of the fastener which parts extend through the said socket hole or opening and over the edge thereof and the said portions also including parts extending toward each other and around the edge of the socket hole or opening concentrically therewith and a plurality of additional portions which overlie the opposite outer edges of the said oppositely disposed portions.

6. The socket member of a snap fastener constructed of a single integral plate and one side of the said socket member consisting of a solid portion of plate having a socket hole or opening therein and the opposite side of the said plate including oppositely disposed portions having central parts which extend through the said socket hole or opening and are bent over and around portions of the edge thereof and constitute spring acting parts, for engaging the ball or stud of the ball member of a fastener and also including parts located on opposite sides of the said central parts which extend toward each other and around the edge of the said socket hole or opening concentrically therewith.

In testimony that I claim the foregoing as my invention, I have hereunto signed my name this 15th day of August, A. D. 1911.

JAMES P. WILLIAMS.

In the presence of—
 Geo. H. Weidner,
 Carrie E. Kleinfelder.